Aug. 8, 1967 G. HUGHES 3,335,416
CHARACTER DISPLAY SYSTEMS
Filed Aug. 10, 1964 5 Sheets-Sheet 1

Inventor
GORDON HUGHES
By Cameron, Kerkam & Sutton
Attorneys

Inventor
GORDON HUGHS
By Cameron, Kerkam + Sutton
Attorneys

Inventor
GORDON HUGHES
By Cameron, Kerkam & Sutton
Attorneys

GORDON HUGHES
Inventor
By Cameron, Kerkam & Sutton
Attorneys

Inventor
GORDON HUGHES
By Cameron, Kerkam & Sutton
Attorneys 3,335,416

CHARACTER DISPLAY SYSTEMS

Gordon Hughes, Manchester, England, assignor to Ferranti Limited, Hollinwood, England, a company of the United Kingdom of Great Britain and Northern Ireland Filed Aug. 10, 1964, Ser. No. 388,358

8 Claims. (Cl. 340—324)

Figure 1:
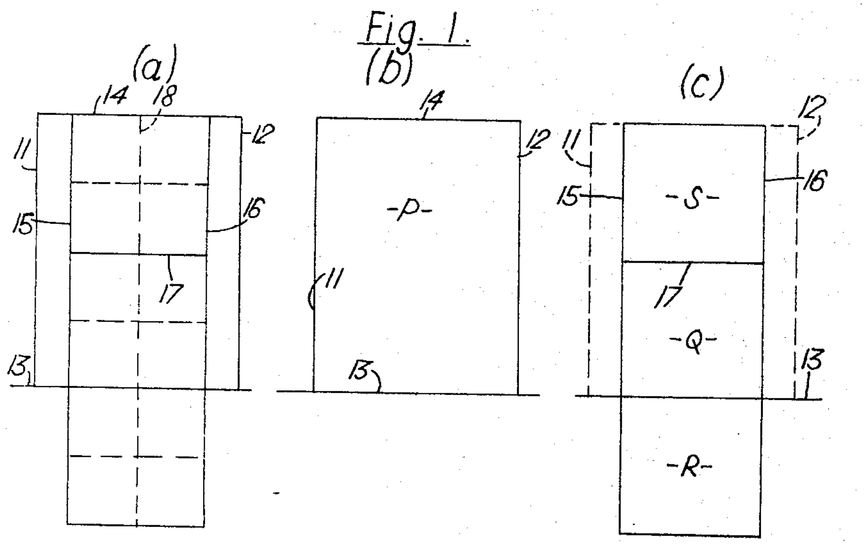

This invention relates to character display systems and in particular to systems for displaying characters of the alpha-numeric kind, with associated symbols, on the screen of a cathode-ray tube.

It is known to form each character on a matrix of dots. To specify each dot of, say, a 16 x 16 matrix by its X and Y coordinates, as represented by the currents applied to the beam-deflection stages of the tube, would require 4+4 or 8 bits of information. Taking 25 dots as the average number needed to form each character, a signal of 200 bits would be required to identify it. Though the logical circuits for decoding such a signal would be very simple, the bit length of each signal would be excessive.

It is also known to build up each character by a few segments in each of which the spot is moved in a specified straight direction; but though in such an arrangement the bit length of the identifying signals may be tolerable most of the characters so formed are noticeably distorted.

It has also been proposed to generate characters by combining single sinusoidal X and Y scans, one of which is twice the frequency of the other, in a Lissajous manner. A figure-of-eight form of trace is thus produced and the desired character is obtained by brightening up only part of the trace or modifying its shape by restricting one or both of the scans. Only a few characters can however be produced in this way, and most of those are considerably distorted.

A further known arrangement is to design for each character a circuit which when brought into operation causes the beam-deflection stages to be so energised as to reproduce that character without undue distortion. Thus a set of, say, 64 characters may be represented by a six-bit word; but as each character requires a logical stage individual to it the total circuitry required is excessive, especially where a full range of a hundred or more characters is required.

An object of the present invention is to provide a character display system which effects a reasonable compromise between the bit length of the character-identifying signals, the extent and complexity of the logical circuits for displaying in response to those signals a wide range of characters, and the distortion of the characters as displayed.

In accordance with the present invention, a system for selectively displaying any character of a given set of characters within a predetermined character display area on a cathode-ray tube screen includes a cathode-ray tube with deflection stages for deflecting the beam in directions at right angles to one another, a plurality of means for generating a corresponding plurality of basic beam deflection signals to produce different predetermined basic character-forming traces on the screen within the display area if applied to the beam deflection stages, selecting means responsive to a coded digital signal representing any one of the basic deflection signals to render operative with said stages the appropriate one of said generating means, modifying means responsive to a coded digital signal representing certain other deflection signals to modify at least some of the basic deflection signals to produce modified traces which differ in their position in the display area and in their extent relative to the basic traces, and arrangements for retaining on the screen the traces in respect of each character, thereby displaying the character as a whole, whereby in operation each of the characters is displayed within the display area, some by a composite trace consisting of basic traces and others by a composite trace consisting of selected modified traces.

The invention relies on a system of producing each character on the screen of a cathode-ray tube. Most characters are built up of a composite trace formed on the screen out of a few component traces—straight lines or simple curves—derived from a small basic range of such traces and located in one or other of a very few component areas of a predetermined imaginary overall frame which encloses the complete character. Considerable economy in the display circuitry is obtained by forming each trace by the combination of simple scanning movements of the beam in X and Y directions at right angles to one another on the instructions of a coded multi-digit signal, the respective digit positions and digit values of which define most of the scan characteristics in accordance with a binary code. In addition to the straight and curved scans, dots may be formed, to act as punctuation or other marks, by momentary illuminations of the beam.

By this means all the printed characters of the Roman, Greek, and Russian alphabets, whether in lowercase or capital form, together with the ten Arabic numerals and a wide range of punctuation marks and mathematical symbols, may each be made up of not more than six component traces selected by a seven-bit signal from a range of not more than 50 basic traces, provided that the effective range is extended by modifying some of the basic traces to cause them to be displayed in one of two sizes and be located in a choice of four areas of the character frame.

When a character composed of more than one trace is to be displayed, the seven-bit signals prescribe in sequence each trace required to make up that character, specifying the position of that trace in the frame, which in certain cases automatically takes care of the size of the trace. In response to each such instruction, selecting means are actuated to select for application to the beam deflection stages the means for generating the deflection signal necessary to produce the trace concerned, those generating means being rendered operative with the deflection stages to cause that trace to be displayed on the screen. Where the trace is other than a basic trace, the coded signal which represents it actuates the modifying means to produce a modified, rather than a basic, deflection of the beam to alter the basic trace as regards both its size and location.

As nearly all the characters require two or more traces, each of which constitutes a different part of the character, the traces will more usually be referred to hereinafter as "parts"; but the term should be understood to include a trace which by itself forms a whole character.

To minimise character distortion, each straight or curved part displayed as the result of such a deflection signal may itself be formed of a few straight-line segments run together and displayed successively. This may be attained by causing the energisation of the beam-deflection stages to be effected in that number of steps and shaping that part by varying from step to step the particular elements of the generating means that are rendered operative with those stages.

Alternatively, each part may be formed by a Lissajous combination of two simultaneous sinusoidal scans of the beam in the X and Y directions at the same frequency.

Whichever system of part generation is used, arrangements are made for retaining on the screen the component parts of a character as successively displayed, so that the character as a whole may be viewed, and for similarly retaining successive characters of a word or other character formation as long as is required. This retention may conveniently be effected by arranging for the screen phosphor to have a long enough persistence, or by repeating the signals so that the displayed parts or characters are repetitively rewritten so as to appear continuously through persistence of vision. Another alternative is to retain the display by photographing it, thereby allowing a phosphor of very short persistence to be used.

Figure 2:
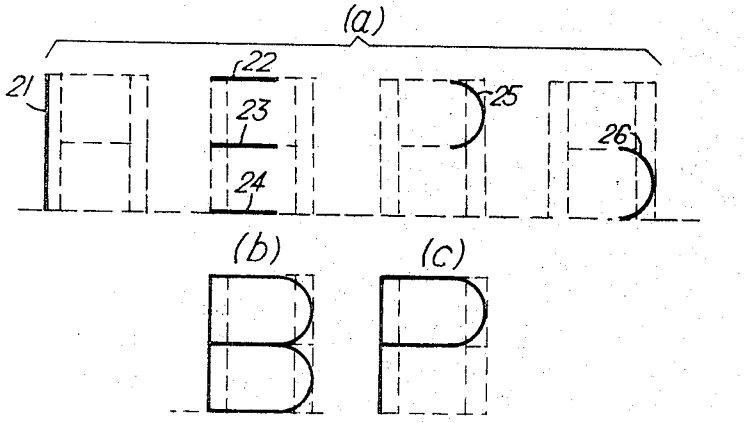
Figure 3:
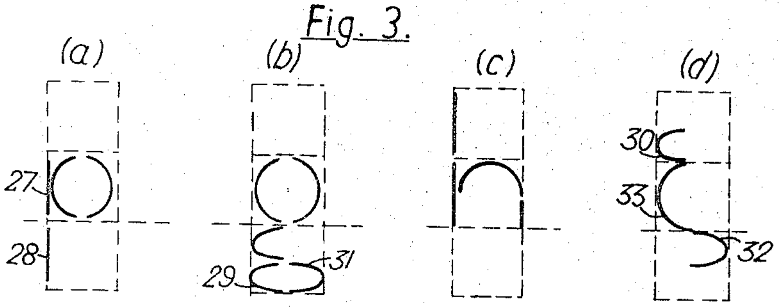
Figure 4:
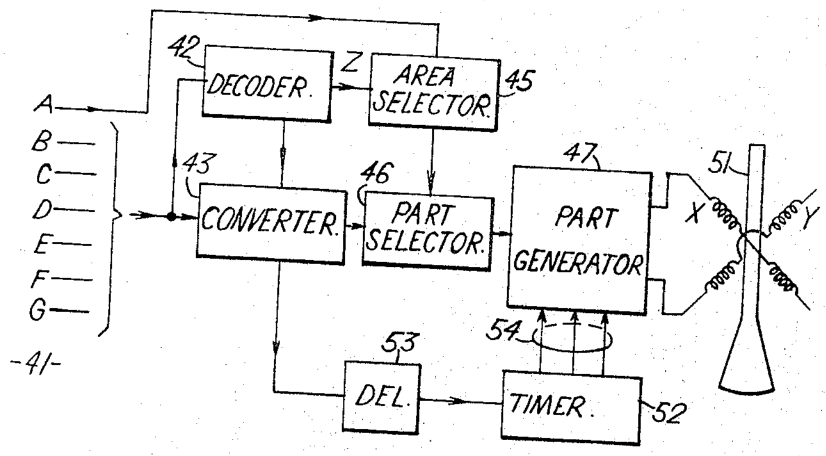
Figure 5:
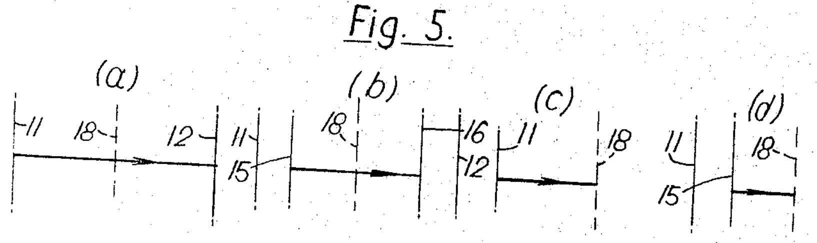
Figure 6:
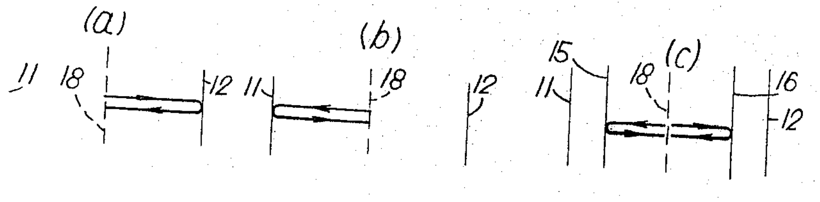
Figures 7, 8, 9, 10:
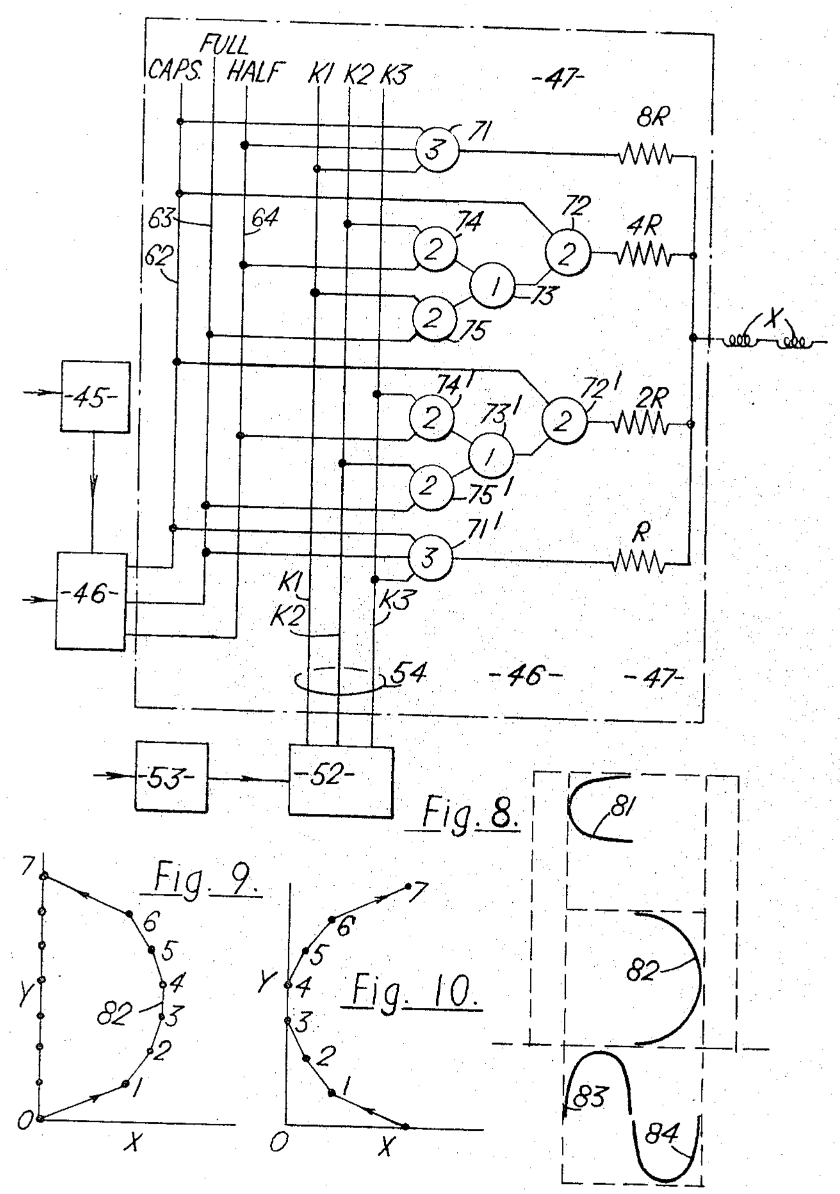
Figure 11:
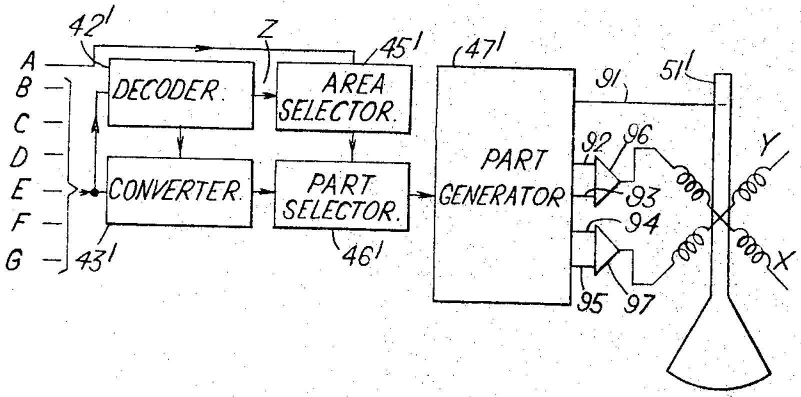
Figure 12:
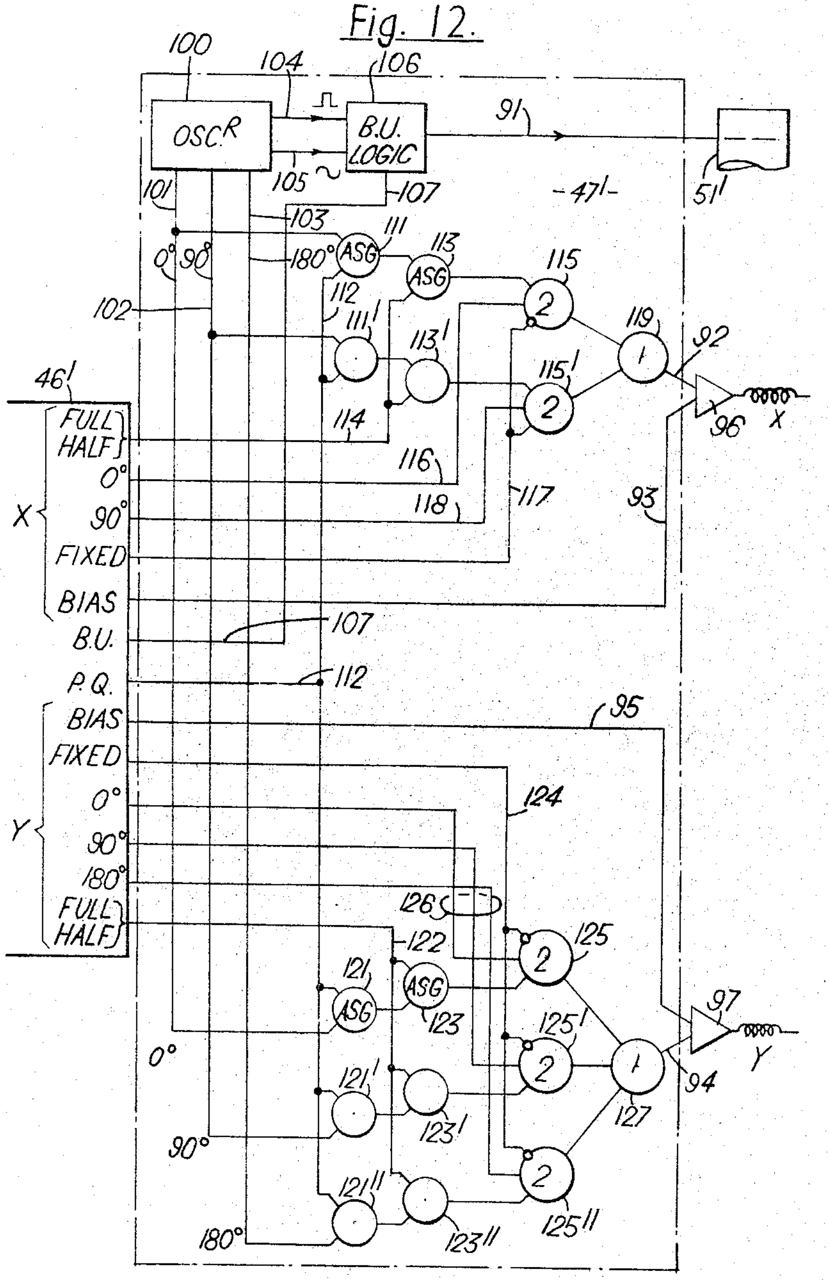

The foregoing very general outline of the invention will be made clearer from the following descriptions, by way of examples, of two particular embodiments of it, made with reference to the accompanying drawings in which, FIGURE 1 shows a character frame in accordance with the invention, FIGURES 2 and 3 show how characters may be formed out of character parts assembled in the frame of FIGURE 1, FIGURE 4 is a simplified schematic diagram of a character display system in accordance with the embodiment, above mentioned, in which each part is formed of straight-line segments, FIGURES 5 and 6 show examples of line scans used in forming character parts, FIGURE 7 is a schematic diagram showing in more detail equipment shown generally in FIGURE 4, FIGURE 8 shows examples of curved parts of characters, FIGURES 9 and 10 show how such curved parts are formed, FIGURE 11 is a simplified schematic diagram of a display system in accordance with another embodiment, and FIGURE 12 is a schematic diagram showing in more detail equipment shown generally in FIGURE 11.

In carrying out the invention in accordance with the first-mentioned embodiment, the frame for each character, as shown in FIG. 1(*a*), is divided into four areas designated P, Q, R, and S. Area P, see also FIG. 1(*b*), which marks the boundaries of large capital letters and numerals, is defined by vertical lines 11 and 12 joined at the foot by the horizontal print line 13 and at the top by another horizontal line 14. By the term "print line" is meant the line on which in normal usage the printed Greek and Roman capital letters rest. Limited by inner vertical lines 15 and 16 are interior square areas Q and R, FIG. 1(*c*), immediately above and below the print line, respectively, and square area S above square Q, from which it is divided by a horizontal line 17. These small areas delimit the lower-case letters. Area Q serves in addition to delimit small capital letters and small numerals, whilst a restricted range of small numerals may be contained in areas S and R to act as suffixes and subscripts. Every character to be reproduced is bounded by the overall frame space formed by areas P and R. The interior lines shown broken in FIG. 1(*a*) are to define the ends of certain of the character parts; of these lines, line 18, which is the vertical centre line of the frame, is of particular importance.

A selection of character parts is shown in FIG. 2(*a*). From the four straight lines 21 and 24 and two semicircular lines 25 and 26 may be formed the capital letter "B,", as shown in FIG. 2(*b*). Clearly the parts 21 to 23 and 25 may form the capital letter "P"—FIG. 2(*c*). A selection of other letters is shown in FIG. 3, with the gap between parts exaggerated to indicate their boundaries. At *a*, *b*, and *c* are shown the lower-case letters "p," "g" and "h" and at *d* the Greek letter zeta.

In all, only 44 basic parts are needed. To multiply the total number of parts available, modified parts are derived from them. Each part appears in the frame in one of the following areas and sizes: (*a*) the basic 44 in area P; (*b*) the same 44 but modified by being reduced in size and transferred to area Q; (*c*) a selection of 20 from modified category *b* but transferred to area R; (*d*) the same 20 of category *c* but in area S. Modified parts *b* to *d* are the result of the effect on the basic deflection signals, corresponding to the basic parts, of the modifying means, to be described shortly.

Thus by varying the location, which in some cases affects the size, a total of 128 parts are available. A few examples of these categories may be seen in FIGS. 2 and 3. All the parts shown in FIG. 2 are in category *a*. In FIG. 3(*a*), part 27 is part 21 of FIG. 2(*a*) but transferred to category *b* and in consequence reduced in size and transferred to area Q; and part 28 is part 27 transferred to category *c* as one of the 20. In FIG. 3(*b*), part 29 in area R and hence in category *c* appears at 30 in category *d* in FIG. 3(*d*), and part 31 is part 26 of FIG. 2(*a*) but reduced in size in category *c*. In FIG. 3(*d*), part 32 is part 25 of FIG. 2(*a*) but now in category *c*.

Though the seven-bit signal could identify each of the 128 parts uniquely, economy in circuit components is obtained by supplying groups of circuit elements to generate only the 44 basic parts and deriving from them the modified parts of categories *b*, *c*, and *d* by reducing the size and by simple shifts of scan to locate each part in the particular one of areas Q, R, and S. Thus, referring to the seven-bits of the signal word as digits A to G, 44 of 64 combinations of digits B to G are used to generate the basic parts for area P, whilst the remaining 20 are combined with digit A to actuate the modifying means so as to define which of the frame areas each part is to be located in. Suitable apparatus for effecting this will now be described in general terms with reference to FIG. 4. It will be assumed for convenience of description that the cathode-ray tube is of the kind using electromagnetic beam-deflection stages—which term includes the deflection coils and any amplifiers associated with them—but it should be understood that a tube of the kind using electrostatic deflection stages may alternatively be employed.

Each seven-bit word of digits A to G is received in parallel form over an input channel in the form of the seven leads 41. The six leads carrying digits B to G are connected to a "20" decoding stage 42 and to a converting stage 43. Stage 42 is designed to respond only to the 20 combinations of digits B to G which represent the parts for areas R and S referred to above as categories *c* and *d*. In response to each of these signals stage 42 passes the signal to stage 43, where it is converted to the corresponding one of the 44 signals, and delivers to an area selection stage 45 a binary digit signal Z; this signal may be considered to be digit "1" in response to a signal representing one of the 20 parts, but otherwise to be digit "0." Digit A of the seven-bit word is also applied to stage 45.

The output from converter 43 is applied so as to control selecting means or part selector, in the form of a logic network shown generally at 46. Each of the 44 basic signals on reaching stage 43 passes through it unmodified to stage 46. Each of the signals representing one of the 20 parts reaches stage 43 direct and passes through it to stage 46, but before it can have any effect there it is converted in stage 43 to the corresponding basic signal under instructions from stage 42.

Signals A and Z, acting by way of stage 45, condition network 46 to the area required for each part in accordance with a two-power binary code. Where digit Z is "0," meaning that the part is one of the 44, network 46 is set to display the part in area P if digit A is "1," but in area Q if digit A is "0." Where Z is "1," meaning that the part is one of the 20, network 46 is set for area S if A is "1" and area R if A is "0."

Thus stages 42 and 45 constitute the modifying means above referred to, since they act by modifying the 44 basic deflection signals for the parts in area P so as to derive the deflection signals for parts in the smaller areas Q, R, and S.

The parts selected by network 46 are represented by groups of electrical circuit elements (in the form of resistors and of gating stages for selecting them) of generating means, or part generator, generally indicated at 47, associated with the X and Y scan coils of the cathode-ray display tube 51. After the resistors of the group corresponding to a particular part have been selected for eventual connection into the circuits of the scan coils, the coils are energised in seven steps, there being connected in circuit with the coils during each step such of the selected resistors as are appropriate to the generation of the particular segment to be set up by that step. The apparatus for effecting this step-by-step energisation of the scan coils includes timing means in the form of a three-power binary counter 52 arranged to be triggered into operation by stage 43, acting by way of a delay stage 53 to ensure that network 46 has been set before the counter begins to operate. The counter exercises its control by pulse-energising the coils in seven steps by way of part-generator stage 47 over the three output leads 54 from the counter in binary manner.

The use of seven steps for part-generation should not be confused with the use of seven digits for part-identification, as the two numbers are in no way related. The number of digits required for identification depends on the total number of parts to be identified. On the other hand the number of segments in a part depends on the required degree of distortionless reproduction; for this purpose seven segments have been found to give good results; that number has the further advantage of being convenient for a binary counter. It is unlikely that less than five segments would give tolerable results, except where the character range is severely restricted. Where the characters to be displayed are of especially large size, requiring more than seven segments for their satisfactory reproduction, a four-stage binary counter may be used, allowing a total of 15 segments.

The operation of the equipment thus generally described is briefly as follows, assuming for example that the character to be displayed is a large capital letter. The parts are demanded in turn by seven-bit signals, each of which is present on leads 41 long enough for the part to be generated on the screen. As the display is for area P, each part is one of the basic 44, with signal A digit "1" and signal Z digit "0." The six-bit portion B to G of each signal therefore passes through converter 43 to network 46 without modification. The combination of the A and Z digits sets the network for area P. Here digits B, C, and D, select the elemental resistors of stage 47 to be switched sequentially into and/or out of the energising circuit of the X scan coils of tube 51, and digits E, F, and G select the resistors for the Y coils. After a delay imposed by stage 53 sufficient to allow these resistors to be selected, counter 52 is triggered to cause the scan coils to be energised through them in the sequence appropriate for displaying that part on the screen.

The successively displayed parts of the character are retained on the screen by the persistence of the screen phosphor. Normally the speed of character-generating is so rapid that a phosphor having a normal degree of persistence will allow the display of words and sentences as a whole.

Where the character has parts in two areas, say the lower-case letter "g," see FIG. 3(*b*), requiring both areas Q and R, the parts above the type line 13 are among the 44 and so are generated with A=0; as these parts are not among the 20, Z is 0 also, and in response network 46 is preset for area Q. The parts below the line, on the other hand, are among the 20; hence whilst A remains at 0, Z becomes 1.

Similarly with a character, such as the lower case "h," see FIG. 3(*c*), requiring areas Q and S; for Q, A and Z are 0, and for area S both change to 1. It will be appreciated that though the several parts of a character may together occupy more than one area of the frame, no one part occupies more than one area.

As already mentioned, the circuitry required for the generation of the character parts is minimised by as far as possible allocating to each of the digit positions B to G of the signal the task of defining a particular characteristic of the scan, each such characteristic being further defined by the value of the corresponding digit.

Thus of the X scan digits B, C, and D, the position B is concerned with a scan in the X direction—that is, horizontal. The length of this is defined by the value of the digit in that position; digit 1 requires a scan of total length equal to either the full width of frame area P, or the full width of frame area Q, depending on the area selected by the AZ signal, whereas in each case digit 0 requires a scan of half such a length.

Digit position C is concerned with the direction—forward (left to right) or reverse—of the initial movement, digit 1 requiring a forward movement and digit 0 the reverse.

Digit position D is concerned with the starting point of the scan with respect to centre line 18 (FIG. 1(*a*)) of the frame. Here digit 1 specifies a start to the right of that line whereas digit 0 specifies a start to the left of it.

Thus if whilst the AZ signal specifies area P, digits B to D have the values 1, 1, and 0 respectively, requiring a scan across the full width of the frame in the forward direction starting to the left of the centre line 18, the resulting scan is as shown in FIG. 5(*a*), assuming that throughout it the Y value is fixed. If on the other hand the AZ signal specifies one of the lower-case areas Q. R, or S, the length of the scan is reduced to the limits defined by the inner verticals 15 and 16 as shown in FIG. 5(*b*). With B=0, these scans are halved, as shown in FIG. 5(*c*) for area P and FIG. 5(*d*) for the lower-case areas.

Where the X digits have the respective values 1, 1, and 1, requiring a forward movement starting to the right of the centre line, the trace for area P reverses its direction after reaching the right-hand limit 12 of the frame. Assuming again that Y is fixed, the full scan is as shown in FIG. 6(*a*), where the forward and reverse movements are depicted displaced from one another for clarity.

Where the X digits have the values 1, 0, and 0, requiring a reverse movement starting to the left of the centre line, digit B again requiring a full length trace, the scan is as shown in FIG. 6(*b*).

And where the AZ signal specifies any of the lower-case areas the scans are reduced to the limits defined by the inner verticals 15 and 16 as shown in FIG. 6(*c*).

Three combinations of the three X digits which are not required to define a scan are used to define fixed positions of X; one of these is on the centre line 18, the other two being on verticals 11 and 12 for area P but on inner verticals 15 and 16 for areas Q to S.

In a similar manner the three Y digits E. F, and G define scans in the Y direction. Fixed Y points at suitable levels are also arranged for.

Except for the fixed points, each of the scans is built up of seven segments, as already mentioned. Thus a straight scan, such as is shown in FIG. 5(*a*), is generated by progressively adjusting in linear steps the resistance in circuit with the X scan coils, the particular value of the resistance at any given step being in part determined by which of the selected resistors are then in circuit with the coils. Arrangements for effecting this as regards area P of the X scan will now be described in somewhat simplified form with respect to FIG. 7.

Four of the group elements of part-generator 47 in the form of resistors are shown at 8R, 4R, 2R, and R, having those relative values. One end of each—the right-hand, as seen in the drawing—is connected to the X scan coils. The switching of the other ends so as to bring selected ones of the resistors into the energising circuit of the scan coils is controlled by logic network 46 designed to receive the six-bit signal B to G from stage 43 (FIG. 4) and switch the resistors associated with the X and Y scan coils into circuit in accordance with the instructions received from that signal and the area-selection instructions from stage 45. To effect this as regards the resistors for the X coils shown in FIG. 7, the network energises an output lead 62 when area P is required and one or other of output leads 63 and 64 according to whether the scan is to cover the full width of the frame as in FIG. 5(*a*) or only half of it, as in FIG. 5(*c*). Leads 54 from the counter 52 are labelled K1 to K3; the sequence in which these are energised in binary fashion will be explained in the description of the operation. Leads 62 to 64 and K1 to K3 are connected to the resistors by way of gates as follows.

Leads 62, 64, and K1 form the inputs to a three-entry And gate 71 the output of which is connected to resistor 8R.

Lead 62 also forms one input to a two-entry And gate 72 the output of which is connected to resistor 4R. The other input to gate 72 is derived from an Or gate 73 the two entries to which are from the outputs of two two-entry And gates 74 and 75. Leads 64 and K2 form the inputs to gate 74, and leads 63 and K1 form those to gate 75.

Similar gating connections are made for resistor 2R, gates 72[1] to 75[1] being equivalent to gates 72 to 75 respectively; but in this arrangement the entries to gate 74[1] are from leads 64 and K3, and those to gate 75 from leads 63 and K2.

Leads 62, 63, and K3 form the inputs to a three-entry And gate 71[1] the output of which is connected to resistor R.

The sources of energisation have been omitted for clarity. It is sufficient for an understanding of the operation to appreciate that whenever one of the four gates 71, 72, 72[1], and 71[1] is in the open condition, the X scan coils are energised in circuit with that one of the four resistors to which the output of that gate is connected. Similarly when two or three of the gates are open the coils are energised in circuit with the associated resistors in parallel.

In operation, for a scan of full length as in FIG. 5(*a*), network 46 in response to the BCD signal 110 and the AZ signal 10 energises lead 62, for capitals, and lead 63, for a full scan. This operation energises one input each of gates 72 and 75 of resistor 4R, and of gates 72[1] and 75[1] of resistor 2R, and two of the three inputs of gate 71[1] of resistor R, thereby selecting for connection into circuit with the scan coils the particular ones of those resistors which form the X portion of the group associated with the character part to be displayed.

The completion of the scan coil energising circuit is effected by the agency of counter 52, on being triggered from stage 43 after a slight delay imposed by stage 53 to ensure that the decoder has had time to select the required resistors as described in the preceding paragraph. The counter operates by energising the three K leads in the usual seven binary steps, namely: K1 only; K2 only; K1 and K2; K3 only; K3 and K1; K3 and K2; K1, K2, and K3.

The first of these steps complete the opening of gate 75 and hence (through gate 73) gate 72 thereby causing the scan coils to be energised through resistor 4R. Assuming that the energising voltage is V and that all other resistances in series with the scan coils can be neglected, the resulting energising current, I, is $V/4R$.

The second step (K2 only) similarly opens gates 75[1] and 72[1]. This causes the coils to be energised through resistor 2R and so increases the energising current to the value $V/2R$ or 2I.

The third step (K1 and K2) increases the current to $V/2R+V/4R$, or 3I.

The fourth step (K3 only) increases the current to $V/R$, or 4I, and so on.

Thus the scan is effected in seven steps of equal segments.

For a scan of half that length as in FIG. 5(*c*), the network 46 energises lead 64 instead of lead 63, thereby preselecting resistors 8R, 4R, and 2R, instead of 4R, 2R, and R. At the first step, the energisation of lead K1 opens gate 71, to cause the coils to be energised through resistor 8R and hence by a current $I/2$. The second step raises the current to $V/4R$ or I. The third to $V/8R+V/4R$, or $3I/2$, and so on. Thus the incremental currents are now $I/2$, and the scan is effected in seven equal segments each of half the length of a segment for the full width scan.

For the shorter scans of the lower-case letters, as in FIG. 5(*b*) and (*d*), a further set of resistors, similar to resistors R, is employed. These resistors are controlled by a set of gates which are similar to those of FIG. 7 and like them are controlled in part from network 46 by way of full-width and half-width leads 63 and 64 and by counter 52. In this arrangement, however, the Capitals leads 62 is replaced by a Lower Case lead which is selected by the decoder when the signal requires it and energised at a lower level—say $2V/3$—than lead 62 so that the scan coils are energised by proportionately less currents.

Similar arrangements are made for the Y coils.

Thus if the X coils are energised in equal increments whilst Y is fixed a straight horizontal trace is drawn, at a level in the frame determined by the fixed value of Y. Similarly if Y is scanned in equal segments whilst X is fixed a straight vertical trace is drawn. And if both sets of coils are simultaneously energised as described, a diagonal trace is drawn, the slope of which depends on the relative overall lengths of the respective scans. The direction of the slope—that is, whether it slants upwards or downwards from left to right—is controlled by controlling the direction of one of the scans as will be explained later.

The positioning of the part in the appropriate area of the frame in accordance with the requirements of the AZ signal is conveniently effected by applying a fixed bias current to a supplementary set of scan coils. Thus the value of such a bias acting in the Y direction determines whether one of the 20 parts is displayed in area R or in area S.

The method of effecting a curvilinear trace will now be described.

The curved parts of characters are all of approximately semicircular or semi-elliptical shape with the diametral chord vertical or horizontal; these will be referred to as the X curves and Y curves respectively. FIG. 8 shows at 81 an X curve which constitutes one of the 20 parts, located in area S of the frame, and at 82 another X curve, this time one of the basic 44 parts located in the lower-case area Q. The curves face different directions and so will be designated left-hand and right-hand curves respectively, these being the directions in which the curves lie with respect to the diametral chord.

Examples of Y curves of the 20 parts are shown at 83 and 84 in area R; there will be designated top and bottom curves respectively, referring again to the position of the curve with respect to the diametral chord.

Reverting to FIG. 3, the curved portions of the lower-case letters p and g in area Q are formed by a right-hand X curve 82 of FIG. 8 and its left-hand equivalent, whilst the curved part of the letter h is a top Y curve, also in area Q.

Each X curve is formed out of straight-line segments by causing the Y scan to be stepped unidirectionally in equal segments (by circuitry corresponding to that of FIG. 7) and at the same time causing the X scan to follow a bi-directional trace of the kind shown in FIG. 6. Thus curve 82 of FIG. 8 is drawn by making a Y scan of half-capital length, equivalent to the X scan of FIG. 5(*c*), whilst imparting to the X scan a bi-directional trace as in FIG. 6(*a*), both scans being located in area Q on the instructions of an AZ signal of digits 0, 0, acting on the separate bias coils.

Such bi-directional X scans are effected, in brief, by sequentially coupling into the energising circuit of the X coils three resistors of unequal value, using much the same circuitry as that of FIG. 7, thereby effecting the outward trace, as described in detail below, and effecting the return trace by sequentially removing those resistors.

Thus the right-hand X curve 82 of FIG. 8 is traced, as shown to an enlarged scale in FIG. 9, by increasing the Y scan current by seven equal increments (using circuitry as in FIG. 7) whilst varying the X scan current by means of three resistors C1 to C3, of value decreasing in that order, which are connected into and out of circuit with the X scan coils in the successive steps as follows, the point reached at the end of each step being indicated on the drawing by the corresponding numeral:

(1) resistor C1 in series with the X coils;
(2) resistor C2 in shunt with C1, thereby increasing the scan current;
(3) resistor C3 in shunt with C1 and C2, thereby again increasing the scan current but by a less amount;
(4) conditions as for step (3), thereby maintaining the X scan fixed at the value reached at the end of step (3);
(5) resistor C3 removed, thereby reducing the scan current; ,
(6) resistor C2 removed;
(7) resistor C1 removed, thereby bringing the trace back to the X origin.

The corresponding left-hand trace is effected merely by altering the timing, so that all three resistors C1 to C3 are in circuit for the first step, are progressively removed so that at the ends of the third and fourth steps the X current is zero (see FIG. 10), and are then sequentially reinserted; the X bias is modified to locate the X origin to the left of its position for the right-hand trace.

The fact that the trace is not strictly curvilinear but formed of straight-line segments is found in practice to introduce no appreciable distortion where the characters are of the small size usually employed in printed matter other than headings.

As already indicated, the circuitry for effecting such curved scans may be generally as shown in FIG. 7. As the only difference in the extent of scan is that between capitals, as shown in FIG. 6(*a*) and (*b*), and lower case, FIG. 6(*c*), the Full and Half controls derived from leads 63 and 64 are not required. Thus for capitals only the three resistors C1 to C3 are needed, in place of the four resistors R, another set of resistors similar to resistors C but of reduced value being required for the lower-case characters. Arrangements are made for controlling the bias under instructions from network 46 so as to locate the X origin in the correct position. Arrangements are also made for reversing the counter signals half way through the scan. This is effected not by reversing the counter itself, which is required to function normally for the Y scan, but by introducing a reversing stage between the counter and the three timing leads corresponding to leads K1 to K3 of FIG. 7 and controlling that stage from network 46. Where the counter is in the usual form of three bistable stages representing the respective powers of two, the effect of reversal may be obtained by switching the three output leads (corresponding to leads K1 to K3) to be energised by the counterphase outputs from the counter after the count has reached the binary value 011.

Similar arrangements are made for forming Y curves.

Curves of other configuration may be generated by suitably adjusting the number and relative values of the resistors sequentially connected into circuit with the deflection coils.

By using a similar reversing stage with the straight-scanning circuitry of FIG. 7, the direction of the X scans may be made the opposite of that shown in FIG. 5—that is, from right to left instead of from left to right. The stage is operated to the reverse condition on instructions from network 46 in response to digit "0" in the C position of the signal. By this means the direction of the slope of a diagonal scan generated by simultaneous X and Y linear scans may be controlled. Alternatively such control may be exercised by including the reversing stage in the straight-scanning circuitry for the Y coils, it being now the Y scan that is reversible, the X being monodirectional (as shown in FIG. 5) except for curve generation.

In the alternative embodiment, above mentioned, each part instead of being formed in several steps by the combination of several successively generated segments, is formed in one step by the Lissajous combination of two simultaneous single-cycle sinusoidal scans in the X and Y directions. The scans are of the same frequency but of either full, half, or zero amplitude, and a bright-up signal is applied to the beam over the portion of the combined scan that is required for the part concerned.

Thus with an X scan of zero amplitude—that is, with the value of X fixed—a Y scan of full amplitude, and bright-up over a half or a full cycle, a part in the form of a vertical line in the area P is produced. By causing the modifying means to halve the Y amplitude the part is produced in area Q, and by causing the modifying means to shift the starting point of the scan, the part is produced in area R or area S as required.

Similarly with Y fixed at zero amplitude and X at full amplitude a horizontal line is produced in area P, and with reduced amplitude and shift of starting point the line is produced in one of the smaller areas.

With both scans at full amplitude and in phase or counterphase a diagonal line of one or other slope is formed in area P. With the scans in quadrature the part becomes circular if both scans are of equal amplitude, but an ellipse if they are of different amplitude. The starting point of the circle or ellipse depends on which is the leading signal: with the X signal leading, the start is at the maximum X point on the curve; with the Y leading, the start is at the maximum Y. By applying the bright-up during only half of such a combined scan a semicircular or semielliptical part is produced.

As the speed of each straight-line scan varies sinusoidally, it is necessary to apply the bright-up so that it varies sinusoidally also, in order to ensure uniform brightness along the line. Where on the other hand the trace is circular, and approximately when the trace is elliptical, the writing speed is uniform, with the result that the bright-up signal need only be applied as a square pulse, so as to cause the beam to have uniform brightness throughout the scan.

Thus by combining the scans with appropriate variations of amplitude, phase, starting point, and bright-up all the basic parts for the area P may be generated, the modifying means functioning much as before to generate the parts for the three smaller areas.

Economy in components is again achieved by as far as practicable allocating the digit positions to defining particular characteristics of the beam scan, the digit values assisting in the definition. Thus using again for each part a seven-digit code signal, A to G, digit A may serve its former purpose of combining with the codes representing the parts for areas R and S to define the area and hence the part size. In this arrangement, however, there are 16 (not 20) parts for areas R and S, and 48 of the basic parts. The other digits may be allocated functions as follows:

B and C: bright-up control (full cycle, first half-cycle, or second half-cycle).

D and E: X and Y amplitudes respectively (full or half in each case).

F: phase control (slope of diagonal; starting point of curve).

G: starting point of half-amplitude scans.

The fourth combination of digits B and C gives the indication that the word is representing one of the 16 parts, which are particularly identified by the ensuing four digits D to G.

There are insufficient digit positions to allow this principle to be applied consistently, and in practice certain characteristics such as the fixing of the X and Y scans, are defined by otherwise unwanted combinations of the six digits.

Suitable apparatus for displaying characters in this manner will now be described in general terms with reference to FIG. 11. This corresponds to FIG. 4 of the first-described embodiment, and similar components are accordingly given their previous designations primed.

The six leads carrying digits B to G are connected to a decoding stage $42^1$ which is similar to stage 42 except that it is designed to respond to 16 characters rather than 20. These leads are also connected to a converting stage $43^1$. The digit signal Z from decoder $42^1$, together with the digit signal received over lead A, are again applied to an area selector stage $45^1$, these two stages constituting the modifying means. Stages $43^1$ and $45^1$ control selecting means, or part selector, in the form of a logic network shown generally at $46^1$.

The character parts selected by network $46^1$ are represented by generating means. These include three leads energised by alternating current at the same frequency but at relative phases 0°, 90°, and 180°, together with gating stages for so selecting these phases as to render them operative with the scan coils X and Y of the cathode-ray tube $51^1$, and arrangements for controlling the bright-up, all of which are indicated generally as part-generator $47^1$ but will be described in detail later.

Each deflection signal so generated is applied to the tube $51^1$ over five output channels 91 to 95 and amplifiers 96 and 97. Over lead 91 is applied the bright-up signal in sinusoidal or square-pulse form depending on whether the part to be displayed is straight or curved, the application of the signal being timed to occur over the appropriate portion of the combined scans. For the X coils, the sinusoidal signal of the correct phase and amplitude, including zero amplitude (that is, a signal of fixed value) where the part is a vertical line, is applied over lead 92 with the starting point defined by a direct-current bias signal applied over lead 93, these two signals being combined by amplifier 96. The sinusoidal and bias signals for the Y coils are applied by way of leads 94 and 95, and amplifier 97. Amplifiers 96 and 97 and the scan coils constitute the beam deflection stages of the tube.

The operation of this equipment is similar to that of FIG. 4 up to the stage of deflection-signal generation. Stage $42^1$ responds to that particular value of digits B and C which indicates the presence of one of the 16 code signals, particularised by the remaining digits D to G, which represent the deflection signals for modified parts in areas R and S. In response to each of these 16 code signals, stage $42^1$ passes it to stage $43^1$, where it is converted to the corresponding one of the 48.

After being thus conditioned to the particular part and area required, network $46^1$ selects in part-generator stage $47^1$ the corresponding generating means and as a result the necessary deflection signal is applied to the tube in the form of the appropriate energisation of leads 91 to 95.

Suitable arrangements for stage $47^1$ are shown in FIG. 12.

The sinusoidal currents for energising the scan coils are derived by an oscillator 100 which supplies over output leads 101 to 103 voltages at the same frequency but of relative phase 0°, 90°, and 180° respectively. The oscillator also supplies over leads 104 and 105 squarewave and sinusoidal signals, respectively, to a bright-up logic stage 106 controlled from network $46^1$ over a bright-up lead 107. The output from stage 106 is applied over lead 91 to the control grid of tube $51^1$.

The X scan coils are energised from the 0° phase lead 101 by way of an amplitude-selection gate (ASG) 111 which is controlled from network $46^1$ over a lead 112 so that the gate passes the signal from lead 101 either in full amplitude or at two-thirds of it, depending on whether the character part is to appear in area P or in one of the smaller areas. (It will be appreciated from FIG. 1(*a*) that the smaller areas have two-thirds the width of area P.)

The output from gate 111 is applied as input to a similar amplitude-selection gate 113 controlled from network $46^1$ over a lead 114 which passes the signal at the amplitude received or at half that amplitude, depending on whether the scan is to occupy the full width or only half of the area concerned.

The output from gate 113 is applied as one of the inputs to a stage 115 which functions mainly as a two-entry And gate; the other entry to the gate is by way of a lead 116, which is energised by network $46^1$ when it is desired to energise the X coils from the 0° phase 101; when lead 116 is so energised, the signal as modified in amplitude by gates 111 and 113 is passed to the X coils without further modification. An overriding control of the gate, however, is exercised from network $46^1$ by way of a lead 117 which is suitably energised when the X signal is to be fixed—that is, when the part to be generated is a vertical line.

Similar arrangements are made in respect of the 90° phase, using corresponding gates indicated by the same references primed. Thus gate $111^1$ receives the signal from 90° phase lead 102 and adjusts its amplitude according to the state of energisation of lead 112; and gate $113^1$ receives the signal from gate $111^1$ and adjusts it or not as required by lead 114. The second And input to stage $115^1$ is derived from a lead 118 which is energised when the X signal is to have the 90° phase; an overriding control of this gate is exercised over lead 117.

The outputs from gates 115 and $115^1$ are combined at an Or gate 119 and thence applied to the X coils by way of lead 92 and amplifier 96. The D.C. bias input to the amplifier is applied by network $46^1$ over lead 93.

Closely similar arrangements are made for the Y coils, the only significant difference being that arrangements are made for energising the coils from the 180° phase lead 113 as well as from the 0° and 90° leads, so as to allow the counterphase energisation of the X and Y coils necessary to produce a diagonal scan of a particular slope. The 180° phase is absent from the X system because it is not necessary to provide it for both coordinates; alternatively, it could be provided for the X system and not for the Y.

The amplitude-selection gates corresponding to gates 111 and $111^1$ are designated 121 and $121^1$ for phases 0° and 90°, and $121^{11}$ for phase 180°. Each is controlled over lead 112; this control is common to both the X and Y systems because if a part is to be in area P or area Q for the X scan it must be in the same area for the Y. The effect of energising lead 112 to bring the Y scan into area Q, however, is to halve its amplitude, rather than reduce it to two-thirds as in the X system.

On the other hand the three gates 123 and $123^1$ (corresponding to amplitude-selection gates 113 and $113^1$) and $123^{11}$ for the third phase, are controlled over a lead 122 independently of gates 113 to allow either scan to be halved without halving the other. Similarly an overriding fixing signal may be applied over a lead 124 to gates 125, $125^1$, and $125^{11}$, independently of gates 115 and $115^1$. The three phase inputs to gates 125 are applied from network $46^1$ over leads generally designated 126.

The outputs from gates 125 are combined at an Or gate 127, then over lead 94 and amplifier 97 to the Y coils, the D.C. bias being applied to the amplifier over lead 95.

The operation of this apparatus may best be understood by considering a few particular examples taken from FIG. 2.

For part 21, in area P, the X scan is fixed (at a point depending on the bias applied over lead 93 to amplifier 96) by the overriding control exercised on gates 115 and $115^1$ over lead 117. For the Y scan, gate 125 (0° phase) is opened, the preceding gates 121 and 123 in this phase defining a full scan in area P. Sinusoidal bright-up is applied over the full cycle of scan.

For part 22, Y is fixed, at a level determined by the bias signal, and X is given a half amplitude scan in area P for the 0° phase, as determined by gates 113, 111, and 115 respectively; the X bias defines the start of the scan to the left of centre line 18. Bright-up is again applied for the full cycle.

A semicircular or semi-elliptical part is generated by conditioning the scans to form a complete circle or ellipse, as the case may be, and applying bright-up during only the relevant half-cycle. To cause the diametral chord to be vertical, the figure is started at the point of maximum Y (that is, with Y leading X by 90°, and hence with the X and Y scans derived from the 0° and 90° phases respectively), thereby causing the points which define the ends of the half-cycles to lie on a vertical line. For the chord to be horizontal, the start is at maximum X and so with the X scan leading. Thus for such a semi-elliptical part as 25, with the chord vertical, the X and Y scans are generated by the 0° and 90° phases, respectively, as determined by gates 115 and 125[1], with bright-up applied by a square pulse for the duration of the first half-cycle only. It will be seen that every curved part that is generated is either a whole or a half of a circle or an ellipse.

For parts in areas Q, R, and S, as required by the modifying means, the necessary reductions in scan are effected at the appropriate ones of gates 111 and 121, the Y bias determining which of those three areas the part is displayed in. In FIG. 3(*d*), for example, part 30 is generated with X and Y in quadrature, Y leading, as determined by gates 115 and 125[1], the amplitudes being as for area Q (gates 111 and 121[1]) but halved (gates 113 and 113[1]), the Y bias locating the trace in the lower half of area S, and the bright-up being for the left-hand half of the circle. Part 33 is generated in a similar manner but with the Y amplitude having its fully Q value and with the Y bias locating the trace in area Q.

The fact that every Lissajous trace is the result of the combination of equal frequencies prevents the distortions arising from the use of figure-of-eight and other traces resulting from the combination of unequal frequencies. The Lissajous traces of the system in accordance with the invention form only straight lines or whole or half circles or ellipses, and from such simple and fully distortionless parts the very wide range of characters above referred to may readily be built up to be themselves almost distortionless.

What I claim is:

1. Apparatus for generating signals, which when applied to the deflection stages of a cathode-ray tube, cause to be selectively displayed any character of a given set of characters within a predetermined character display area on the cathode-ray tube screen comprising a plurality of generating means for generating a corresponding plurality of basic beam deflection signals to produce different predetermined basic character-forming traces on the cathode-ray tube screen within the display area if applied to the beam deflection stages, an input channel adapted to receive coded digital signals representing basic deflection signals, selecting means connected to the input channel and to the generating means and responsive to certain of said coded digital signals representing any one of the basic deflection signals to render operative the appropriate one of said generating means, size and position modifying means connected to the input channel and to the selecting means and responsive to other coded digital signals representing certain other deflection signals for modifying predetermining ones of the basic deflection signals to produce modified traces which differ from the basic traces in respect of only the size of the traces and their position in the display area, thereby displaying the character as a whole either by a single trace or by a composite trace consisting of selected basic and/or modified traces, depending on the configuration of the character.

2. Apparatus as set forth in claim 1 further including means for retaining on the screen the traces in respect of each character.

3. Apparatus as claimed in claim 1 wherein the selecting means include a logic network operative to allow predetermined digit positions of the coded signals to be respectively allocated to defining particular characteristics of the beam scan, some at least of such characteristics being furthed defined by the corresponding digit values.

4. Apparatus as claimed in claim 1 wherein the generating means includes a corresponding plurality of groups of electrical elements for effecting energization of the beam deflecting stages, timing means for rendering the elements of each group operative with the deflection stages in at least five steps, thereby causing each trace to be formed of a like number of straight-line segments.

5. Apparatus as claimed in claim 4 wherein said elements include resistors and gating stages, said gating stages being arranged for connecting the resistors into circuit with the deflection stages in a step by step manner, the timing means being operative to control the gating stages so as to cause the resistance of the circuit to be changed in equal steps where the trace to be formed is straight, but unequal steps where the trace is to be curved.

6. Apparatus as claimed in claim 1 wherein the generating means includes means for forming each of said traces in one step by the Lissajous combination of two simultaneous sinusoidal deflections of the beam of the same frequency in said directions, and for shaping the trace by adjustment of the relative amplitudes, phases, and starting points of the respective deflections, and of the bright-up period of the combined deflections.

7. A system as claimed in claim 6 wherein the means for forming each trace include supply leads energised in relative phases 0°, 90°, and 180°, together with gating stages arranged for coupling the appropriate ones of those leads to the deflection stages under the control of the selecting means.

8. A system as claimed in claim 6 wherein the bright-up means for adjustment of the bright-up period of the combined deflections is operative such that every curved one of said traces is of a preselected curvature.

References Cited

UNITED STATES PATENTS

| | | | |
|---|---|---|---|
| 2,989,702 | 6/1961 | White | 340—324.1 |
| 3,047,851 | 7/1962 | Palmiter | 340—324.1 |
| 3,164,822 | 1/1965 | Uphoff | 340—324.1 |
| 3,205,488 | 9/1965 | Lumpkin | 340—324.1 |

NEIL C. READ, *Primary Examiner.*

A. J. KASPER, *Assistant Examiner.*